March 12, 1963 M. A. MILLER 3,081,435
SUPPRESSION OF GRID CURRENT EFFECTS IN D.C. AMPLIFIERS
Filed Oct. 20, 1955
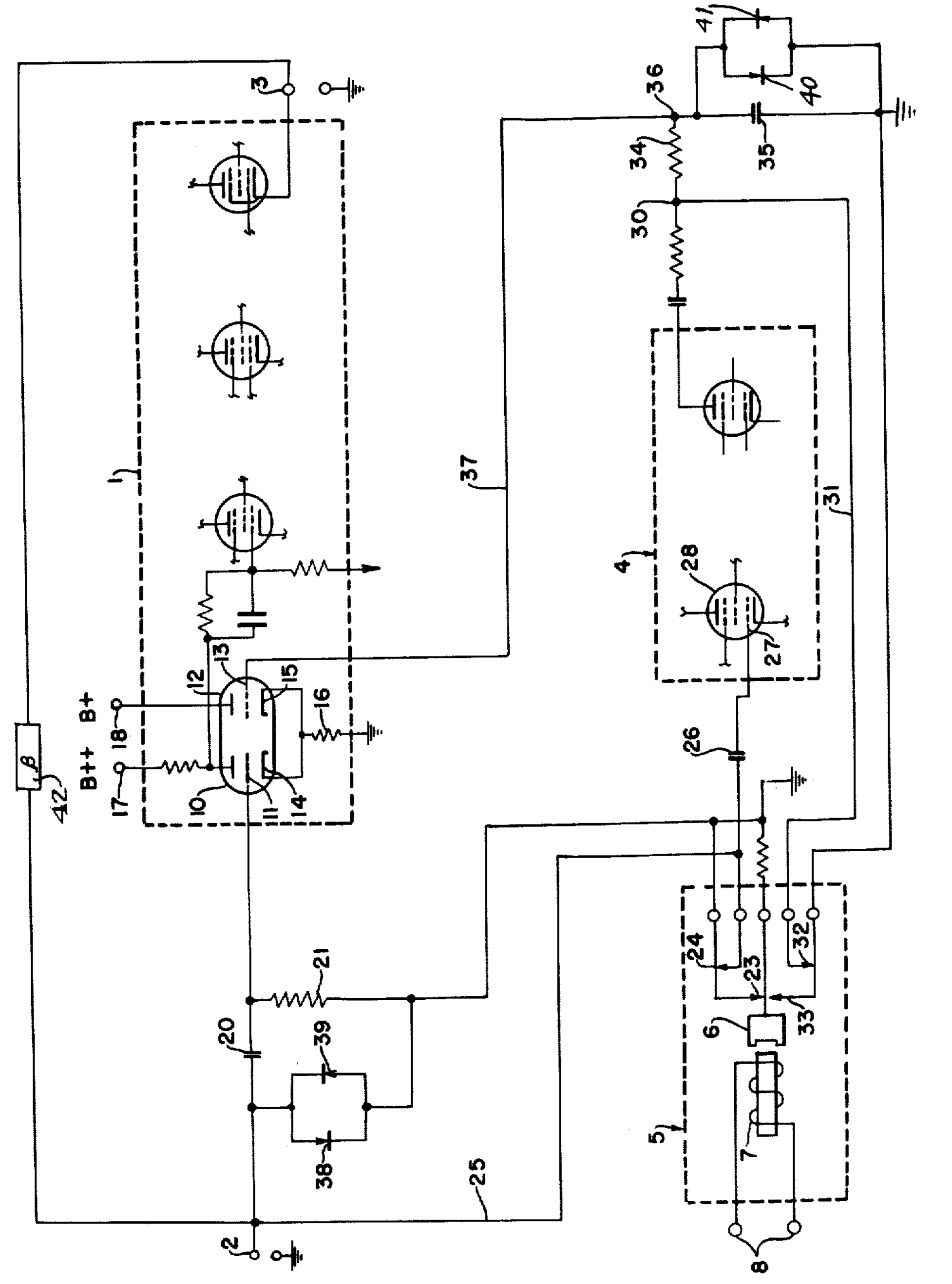
INVENTOR
MONROE A. MILLER
BY
Pennie, Edmonds, Morton, Barrows & Taylor
ATTORNEYS United States Patent Office 3,081,435

Patented Mar. 12, 1963

3,081,435

SUPPRESSION OF GRID CURRENT EFFECTS IN D.C. AMPLIFIERS

Monroe A. Miller, Little Silver, N.J., assignor to Electronic Associates, Inc., Long Branch, N.J., a corporation of New Jersey Filed Oct. 20, 1955, Ser. No. 541,555

6 Claims. (Cl. 330—9)

This invention relates to electronic analog computing apparatus which includes direct coupled amplifiers in combination with automatic balancing circuits and more particularly to the suppression of grid blocking effects in such apparatus.

It has become conventional in recent years to amplify slowly varying direct current potentials through the use of a so-called automatic balancing circuit, comprising a modulated carrier-type amplifier, in conjunction with a direct coupled or D.-C. amplifier. This technique is used not only in electronic analog computers, but in other devices. The result is that the combination of the two types of amplifiers affords the freedom from drift of the modulated carrier amplifier and the superior high-frequency response of the direct coupled amplifier. Moreover, such circuits have exceptionally high overall gain which is particularly useful in electronic computers.

It is known that the operation of a direct coupled amplifier utilizing an automatic balancing circuit may be considerably improved by elimination from the summing juncture of all extraneous currents such as the grid current due to the input tube. This grid current may be eliminated through the use of a grid blocking capacitor and separate grid return resistor as is well known. However, the introduction of the grid blocking capacitor into the input circuit of the input tube immediately creates an additional difficulty. The direct coupled amplifier is now sensitive to overloads which are likely to occur. During overload, an abnormally high signal voltage is applied to the input circuit of the direct coupled amplifier which charges the grid blocking capacitor to a degree such that, when the condition causing overload is removed, the charge on the capacitor continues to bias the input tube out of its normal operating range. Of course, this disables the amplifier until the charge on the capacitor falls to a normal value. The time required for the excessive charge to leak off the blocking capacitor may be quite long, and the amplifier remains disabled for this time even though the cause of the overload is removed.

The modulated carrier amplifier of the combination usually requires some filtering in conjunction with its output rectifier. The time constant of this filter subjects the tube which inserts the out put of the modulated carrier amplifier into the D.-C. amplifier to the same sort of overload effect as does the previously described blocking capacitor.

A common, but not very satisfactory, solution to the difficulty outlined above involves the use of a mechanical relay which momentarily establishes a dead short across the overcharged capacitor. An alternative is to provide manually operated shorting switches across the grid blocking capacitor and a warning light, such as a neon glow lamp, which will give a visible indication that an overload exists. Of course, this latter method requires that an operator be constantly in attendance and that he keep a continuous watch for indications of an overload.

I have invented means for overcoming the undesirable effects of overloading of capacitive elements in the input circuits of a direct coupled amplifier having an automatic balancing circuit. According to my invention, although an input circuit to the grid of an input stage of a direct coupled amplifier includes capacitive and resistive elements, I provide means for preventing excessive charge from accumulating on the capacitive element. The potentials across such capacitive elements are limited to a value such as not to bias the tube grids beyond their proper operating range immediately upon removal of the overload.

The requirements imposed on such means are generally that they must not interfere with the normal operation of the amplifier in any respect. Yet, whenever the amplifier is overloaded, the limiting means must immediately come into operation so that immediately upon removal of the faulty signal the amplifier will be restored to normal operation. I have found that silicon junction diodes have precisely the characteristics which this problem requires. One of the characteristics of a silicon junction diode is that it has extremely high impedance while the voltage impressed across it remains close to zero, but that the impedance immediately drops to a low value when its critical voltage is exceeded in one polarity. For example, a typical silicon diode with an impressed voltage of from zero to one or two will have an impedance of several hundred megohms, but above this critical voltage the impedance will drop to a value of the order of 10 ohms. Therefore, it is possible to insert a pair of oppositely connected silicon junction diodes at the summing juncture and thereby limit the signal voltage to below the value that will affect the normal operation of the circuit. When an overload does occur the blocking capacitor is charged only to the voltage appearing across the diodes. Upon removal of the faulty input signal recovery is not hampered by circuit saturation effects, and the capacitor will automatically discharge within a relatively short time, usually one-quarter second or less. This obviously is a great improvement over the fifteen or twenty seconds period, or even longer, which is required for the condenser to discharge itself through normal leakage paths if the circuit of my invention is not used. Moreover, being entirely automatic in its operation, it requires no attention from an operator.

As previously stated, a further requirement of any such means for preventing prolonged overloads of the grid blocking capacitor is that the means employed does not itself introduce any extraneous or spurious voltages when the amplifier is otherwise operating normally. Such extraneous voltages would introduce errors into the input of the circuit and would result in the introduced error's being greatly amplified and appearing in the output of the amplifier.

A similar difficulty, above described in connection with the grid blocking capacitor, occurs with the filter capacitor in the output circuit of the synchronous vibrator rectifier used in the automatic balancing circuit. The output of the vibrator rectifier is utilized to vary the cathode potential of the input stage of the direct coupled amplifier. This is usually accomplished by means of an auxiliary input stage which is cathode coupled to the primary input stage of the direct coupled amplifier. An overload of the circuit will also build up a sufficient potential across the filter capacitor to block the auxiliary input stage. This is due to the fact that, in both instances, the capacitor which receives the charge is connected on one side to the grid of an amplifier stage and additionally so as to receive a charge from a signal voltage. Hence, in both instances this charge, if great enough, can operate to block the tube or stage which includes the grid to which this capacitor is connected. According to my invention a pair of oppositely connected silicon junction diodes, shunted across the mentioned capacitor, i.e., connected in a conductive shunt path for signal potential with respect to this capacitor, will limit initial charge on the filter capacitor to within the operating range of the input tube thereby providing recovery immediately upon removal of the faulty signal.

These and other features of my invention are below set forth with greater particularity in connection with the accompanying drawing which is a schematic representation of a direct coupled amplifier having an automatic balancing circuit.

Referring now to the figure, there is shown within the rectangle 1 a schematic block diagram of a conventional direct coupled amplifier having an input terminal 2 and an output terminal 3. Within the rectangle 4 there is shown a conventional resistance-capacitance coupled A.-C. amplifier. Operating in conjunction with the amplifier 4 is a synchronous vibrator rectifier 5 having an armature 6 and a field coil 7. The latter is supplied through terminals 8 with an alternating current potential of suitable frequency, e.g. 100 cycles per second.

The direct coupled amplifier 1 comprises a primary triode vacuum tube input stage 10 having a control grid 11 and an auxiliary triode input stage 12 having a control grid 13. The cathodes 14 and 15 of the two stages have a common cathode resistance 16 to ground. Stages 10 and 12, being cathode-coupled, may be considered as a differential D.-C. amplifier input stage. The anode voltage supplied at terminal 17 for stage 10 will generally be greater than the voltage supplied at terminal 18 for stage 12.

The input circuit to the grid of the primary input stage 10 includes a grid blocking capacitor 20 connected between the input terminal 2 and grid 11 and a grid return resistor 21 connected between the grid and ground.

The vibrator-rectifier 5 is provided with a first set of contacts 23, 24 cooperating with the armature 6 to convert a direct current signal potential taken from the input terminal 2 through the connection 25 into a pulsating direct current potential having an amplitude proportional to the D.-C. signal. This pulsating potential is impressed through coupling capacitor 26 to the control grid 27 of the first stage 28 of the A.-C. amplifier 4 and is then amplified in the several stages of the amplifier and appears as a modulated output signal at the terminal 30.

A second set of contacts 32, 33 of the vibrator 5 is connected to the terminal 30 through a conductor 31. Inasmuch as this second set of contacts operates 180° out of phase with the first set of contacts 23, 24, the amplified signal at the output terminal 30 is reconverted to a unidirectional signal, viz., it is demodulated. It is then filtered in a conventional low-pass filter comprising the resistance 34 and the capacitor 35 to remove high-frequency components.

The amplified and rectified signal at the terminal 36 serves as a correction voltage or balancing signal for the direct coupled amplifier. This correction voltage is of such polarity and is introduced at such control electrode in the D.-C. amplifier with respect to degree of amplifier gain controlled by that electrode, as to compensate for the effects of drift due to variations in circuit components caused by aging, temperature changes, etc., to a high degree, and therefore is of great value in electronic computers.

In this embodiment, the balancing signal is impressed through conductor 37 on the grid 13 of auxiliary input stage 12 of the direct coupled amplifier 1 and, as previously indicated, the auxiliary input stage is cathode coupled to the primary input stage through the cathode resistance 16. This latter resistance being common to the two input stages, a change in current through the stage 12 due to a change in potential on the grid 13 serves to determine the negative cathode potential of the primary input stage 10.

Now, it is well known that whenever the absolute value of the output voltage of an amplifier, such as I have described above, exceeds a certain permissible level, the amplifier will become "saturated" and can no longer function as a linear device. In this condition, the amplifier output signal as fed back to the input through feedback circuit 42 will be deficient, and the so-called error voltage at the amplifier input terminal will increase greatly.

In accordance with the customary use of terms in this art, the "error voltage" is a voltage difference at the input of the amplifier which is due to inequality of the feedback voltage and the applied signal voltage. When "saturated," an amplifier or a feedback circuit will operate non-linearly, usually because of overloading. The Greek letter beta ($\beta$) represents the feedback ratio.

In conventional direct coupled amplifier circuits, normal operating conditions can be re-established quickly after an overload simply by inactivating the amplifier momentarily. However, in amplifiers employing automatic balancing circuits, as previously stated, the grid blocking capacitors or the filter capacitors, or both, commonly used in these circuits will tend to charge up while the amplifier is overloaded. Then, even though the device is inactivated following an overload, the grid blocking and filter capacitors will require some time to discharge to a voltage level which will again permit the amplifier to operate as a linear device. The invention is equally applicable to grid blocking capacitors such as capacitor 20, and to filter capacitors such as capacitor 35, because each is connected to a control grid or electrode.

As pointed out above, several means have been resorted to for quickly eliminating the effects of this residual charge on the grid blocking and filter capacitors. None of these means has been entirely satisfactory; yet prior to my invention no fully automatic and foolproof means for immediately overcoming the effects of an overload has been known. I have found that the essential conditions which must be met by a satisfactory device for discharging these condensers are met by silicon junction diodes. Accordingly, I utilize preferably a pair of silicon junction diodes 38 and 39 parallel-connected to each other in opposite polarity in a D.-C. conductive circuit between the signal input terminal 2 and a point of fixed potential (ground) so as to comprise a shunt path for the input signal with respect to the input condenser 20. In a similar manner I use a second pair of silicon junction diodes 40 and 41 oppositely connected in a conductive circuit between input terminal 36 and the common terminal (ground) thus to shunt the filter capacitor 35 in the output of the synchronous vibrator 5, so as to prevent the buildup of excessive direct voltage across this condenser upon the application of large signal voltage thereto. Due to the extremely high impedance of this type of diode when the voltage across it is zero or very small, the presence of one or more of these diodes in the circuit does not affect the otherwise precision operation of the direct coupled amplifier and automatic balancing circuit. On the other hand, silicon junction diodes have a characteristic impedance which drops rapidly to a very low value as the applied voltage is increased. By suitable adjustment of circuit constants, the range of grid bias for linear operation of the triodes 10 and 12 may be made to correspond with the range of operation of the diodes. Furthermore, this type of diode does not introduce spurious voltages which, as previously explained, may introduce serious errors. These diodes, therefore, effectively limit the charges on the grid blocking capacitor 20 and filter capacitor 35 to values within the operating range of the triodes. Then, when overload conditions occur and the amplifier becomes saturated the capacitors do not develop a voltage of value great enough to exceed the linear range of the triodes. Consequently, almost immediately upon release of overload conditions the amplifier completely recovers. This time is generally less than one-quarter second as compared to periods of many seconds or even minutes required for the capacitors to discharge themselves without the aid of my invention.

The use of my invention in a direct coupled amplifier and automatic balancing circuit completely eliminates the use of shorting relays or reliance on error lights to indicate when manually operated switches should be closed to remove excessive charges from the capacitors in the circuits of the amplifier input stages.

While I have described but one embodiment of my invention, it will be clear to those skilled in the art that other embodiments within the scope of the subjoined claims may be employed.

I claim:

1. A stabilized D.C. amplifier system comprising in combination: a signal input terminal; an output terminal; a common terminal; a multi-stage D.C. amplifier having an input stage coupled between said input and common terminals, and having an output stage coupled between said output and common terminals, each stage having a plurality of electrodes including at least one grid; a feedback circuit connected between said output terminal and said input terminal; an input capacitor connected between said input terminal and the grid of said input stage so as to block the flow of grid current from the said last-named grid to said input terminal; a balancing amplifier coupled between said input terminal and said input stage; and diode means connected in a direct-current-conductive circuit between said input terminal and said common terminal so as to comprise a shunt path for input signal voltage with respect to said input capacitor, said diode means having the characteristics of a semi-conductor diode including the characteristics that it is free from the generation of spurious small voltages and that its impedance is effectively infinite within the normal range of signal voltage at said input terminal, and that its impedance drops to a very low value when said voltage exceeds said range, thereby preventing the buildup of excessive direct voltage on said capacitor upon the application of input signal voltage to the input terminal in excess of said normal voltage range.

2. A stabilized D.C. amplifier system comprising in combination: a signal input terminal; an output terminal; a common terminal; a multi-stage D.C. amplifier having an input stage coupled between said input and common terminals, and having an output stage coupled between said output and common terminals, each stage having a plurality of electrodes including at least one grid; a feedback circuit connected between said output terminal and said input terminal; an input capacitor connected between said input terminal and the grid of said input stage so as to block the flow of grid current from the said last-named grid to said input terminal; a balancing amplifier coupled between said input terminal and a grid in said D.C. amplifier other than said grid of said input stage; and a pair of like silicon diodes connected in parallel with each other and in reverse polarity in a direct-current-conductive circuit between said input terminal and said common terminal so as to comprise a shunt path for input signal voltage with respect to said input capacitor, each of said diodes having the characteristics that it is free from the generation of spurious small voltages and that its impedance is effectively infinite within the normal range of signal voltage at said input terminal, and that its impedance drops to a very low value when said voltage exceeds said range in one polarity, thereby preventing the buildup of excessive direct voltage on said capacitor upon the application of input signal voltage to the input terminal in excess of said normal voltage range.

3. A stabilized D.C. amplifier system comprising in combination: a signal input terminal; an output terminal; a common terminal; a differential D.C. amplifier having first and second inputs each including a grid, and having its output coupled between said output and common terminals; feedback means connected between said output terminal and said input terminal; a blocking capacitor connected between said input terminal and the grid in the first input of said differential D.C. amplifier to prevent grid current flow from the first input of said D.C. amplifier to said input terminal; a balancing amplifier coupled between said input terminal and the grid of said second input of said differential D.C. amplifier; and diode means connected in a direct-current-conductive circuit between said input terminal and said common terminal so as to comprise a shunt path for input signals with respect to said capacitor and with respect to said first input of said D.C. amplifier, said diode means having the characteristics of a semi-conductor diode including the characteristics that it is free from the generation of spurious small voltages and that its impedance is effectively infinite within the normal range of signal voltage at said input terminal, and its impedance drops to a very low value when said signal voltage exceeds said range thereby preventing the buildup of excessive direct voltage on said capacitor upon the application of input signal voltage to the input terminal in excess of said normal voltage range.

4. In a stabilized D.C. amplifier system which is subject to blocking due to overloading, the combination which comprises: a signal input terminal; an output terminal; a common terminal; a differential D.C. amplifier having first and second inputs including first and second grids, respectively, and having an output circuit connected between said output and common terminals; a feedback circuit connected between said output terminal and said input terminal; a blocking capacitor connected in series between said input terminal and said first grid for preventing flow of grid current from said first grid to said input terminal; first diode means connected between said input terminal and said common terminal and being thereby connected directly from one side of said blocking capacitor to said common terminal; a balancing amplifier having its input connected between said input terminal and said common terminal; a high-frequency filter connected to couple the output of said balancing amplifier to said second grid, said filter including a filter capacitor connected betwen said second grid and said common terminal; and second diode means connected between said second grid and said common terminal and being thereby connected directly between one side of said filter capacitor and said common terminal; each of said first and second diode means having the characteristics of a semi-conductor diode including the characteristic that it is free from the generation of spurious small voltages and that its impedance is effectively infinite within the normal range of voltage across it, and that its impedance drops to a very low value when the voltage across it exceeds said range, respectively, thereby to provide a shunt path for signal voltage with respect to the capacitor to which it is directly connected, so as automatically to prevent the buildup of excessive direct voltage across such capacitor upon the application of signal voltage thereto in excess of each said voltage range, respectively.

5. A D.C. amplifier system comprising in combination: a signal input terminal; and output terminal; a common terminal; a differential D.C. amplifier having a first input including a first grid which is connected to said input terminal, a second input including a second grid, and an output circuit connected between said output and common terminals; a feedback circuit connected between said output terminal and said input terminal; a balancing amplifier having its input connected between said input terminal and said common terminal; a high-frequency filter coupling the output of said balancing amplifier to said second grid of said differential amplifier and including a filter capacitor connected between said second grid and said common terminal; and diode means connected between said second grid and said common terminal; said diode means having the characteristics of a semi-conductor diode including the characteristics that it is free from the generation of spurious voltages, that its impedance is effectively infinite within the normal range of voltage across it, and that its impedance drops to a very low value when said voltage across it exceeds said range, thereby to prevent a direct voltage of magnitude in excess of said range from being impressed on said second grid.

6. A D.C. amplifier system comprising in combination: a signal input terminal; an output terminal; a common terminal; a differential D.C. amplifier having a first input including a first grid which is connected to said input terminal, a second input including a second grid, and an output circuit connected between said output and common terminals; a feedback circuit connected between said output terminal and said input terminal, a balancing amplifier having its input connected between said input terminal and said common terminal; a high-frequency filter coupling the output of said balancing amplifier to said second grid of said differential amplifier thereby to impress a balancing signal voltage on said second grid, said filter including a filter capacitor connected between said second grid and said common terminal; and a pair of like silicon diodes connected in parallel with each other in reverse polarity in a direct-current-conductive circuit between said second grid and said common terminal so as to comprise a shunt path for excessive balancing-signal voltage with respect to said capacitor, each of said diodes having the characteristics that it is free from the generation of spurious voltages, that its impedance is effectively infinite within the normal range of signal voltage across it, and that its impedance drops to a very low value when said voltage across it exceeds said range in one polarity, thereby to prevent from being impressed on said second grid a direct voltage of magnitude sufficient to block the operation of said differential amplifier.

References Cited in the file of this patent

UNITED STATES PATENTS

| | | |
|---|---|---|
| 1,961,937 | McCutchen | June 5, 1934 |
| 2,111,386 | Buchmann et al. | Mar. 15, 1938 |
| 2,356,589 | Hessenberg | Aug. 22, 1944 |
| 2,429,419 | McCoy | Oct. 21, 1947 |
| 2,434,929 | Holland et al. | Jan. 27, 1948 |
| 2,603,708 | Anger | July 15, 1952 |
| 2,835,867 | Golden | May 20, 1958 |

FOREIGN PATENTS

| | | |
|---|---|---|
| 418,811 | Great Britain | Oct. 31, 1934 |
| 744,009 | Germany | Jan. 7, 1944 |
| 233,108 | Switzerland | Oct. 2, 1944 |
| 137,715 | Australia | June 26, 1950 |

OTHER REFERENCES

Goldberg, RCA Review, June 1950, vol. 11, No. 2, pp. 296–300.

Korn and Korn, text, "Electronic Analog Computers," first edition, 1952, pp. 200–210.

Electronics, article, "Diode Limiters Simulate Mechanical Phenomena," Nov. 1, 1952 (pp. 122–126) by Merrill and Baum.

UNITED STATES PATENT OFFICE

CERTIFICATE OF CORRECTION

Patent No. 3,081,435 March 12, 1963

Monroe A. Miller

It is hereby certified that error appears in the above numbered patent requiring correction and that the said Letters Patent should read as corrected below.

Column 1, line 52, for "out put" read -- output --; column 2, line 46, for "error's" read -- errors --; column 3, line 31, before "ground" insert -- a point of fixed potential usually --.

Signed and sealed this 1st day of October 1963.

(SEAL)
Attest:

ERNEST W. SWIDER
Attesting Officer

DAVID L. LADD
Commissioner of Patents